United States Patent [19]
Hesse et al.

[11] 3,979,218
[45] Sept. 7, 1976

[54] PROCESS FOR PREPARING CEMENT

[75] Inventors: Wolfgang Hesse, Wiesbaden; Guido Lorentz, Frankfurt am Main-Hochst; Klaus Rauhut, Wiesbaden, all of Germany

[73] Assignee: Hoechst Aktiengesellschaft, Frankfurt am Main, Germany

[22] Filed: Mar. 5, 1975

[21] Appl. No.: 555,587

[30] Foreign Application Priority Data
Mar. 9, 1974 Germany............................ 2411297

[52] U.S. Cl..................................... 106/90; 260/38
[51] Int. Cl.$^2$............................................ C04B 7/02
[58] Field of Search......................... 106/90; 260/38

[56] References Cited
UNITED STATES PATENTS

| | | | |
|---|---|---|---|
| 3,240,736 | 3/1966 | Beckwith | 260/29.2 |
| 3,526,559 | 9/1970 | Hale et al. | 156/335 |
| 3,666,703 | 5/1972 | Murata | 106/90 |

FOREIGN PATENTS OR APPLICATIONS

| | | | |
|---|---|---|---|
| 231,242 | 3/1925 | United Kingdom | 106/90 |

*Primary Examiner*—Patrick P. Garvin
*Assistant Examiner*—John P. Sheehan
*Attorney, Agent, or Firm*—Hammond & Littell

[57] ABSTRACT

A cement composition yielding alkaline-resistant bonds consisting of a mixture of a) a solution of at least one partially etherified methylol phenol and at least one partially etherified methylol alkylphenol in a solvent, the methylol phenol components having at least two positions reactive with formaldehyde and being free of alkaline catalysts used in their preparation, with b) a cement powder containing an acid catalyst, an acid-hardened, alkali-resistant cement obtained therefrom by curing and the process of their preparations.

14 Claims, No Drawings

PROCESS FOR PREPARING CEMENT

This invention relates to alkali-resistant cements containing phenol resols as binding agents.

It has been proposed to use phenol resins of the resol type as binding agents for acid-hardening cements. Such cements additionally contain a cement powder containing inert fillers, an acid catalyst necessary to set the cement mixture, either in the form of an acid or a substance which splits off an acid, and optionally other additives such as dyes. The phenol resins proposed for use in such acid-hardening cements have heretofore been selected only from the point of view of their short setting times, while their storage properties have not really been considered. Resols with poor storage properties are generally undesirable for economic reasons. In addition the cement should preferably have a fairly long processing time, but in general this is not compatible with the need for a short setting time.

The poor resistance to alkalis, and in particular the poor early resistance to alkalis after hardening at room temperature, is a great disadvantage in the previously proposed acid-setting cements based on phenol resols. This poor alkali resistance is thought to result from the structure of the phenol resins and depends on the solubility of the resins themselves or of their insufficiently cross-linked hardening products. By "early resistance to alkalis" is meant the resistance of the cements to alkalis immediately after setting. Clearly it is desirable to use articles treated with or formed from the cement as soon as possible.

It is indeed known from U.S. Pat. Nos. 2,606,934, 2,606,935 and 2,659,710 that the solubility of phenol resins in alkalis is lower when the phenolic hydroxyl groups are etherified completely or to a large extent. Etherification may be effected by reaction with epoxy compounds, with alkyl or alkenyl halides as in the Williamson synthesis, with dialkyl sulphates or with diazomethane. These known processes aim at total or substantial reaction of the phenolic hydroxyl groups in the phenol resins. However the etherified products obtained are not suitable for use in cements because they do not set at room temperature, even in the presence of high concentrations of acid.

It has also been proposed to prepare mixed resols from phenol, alkylphenols and formaldehyde in the presence of basic catalysts. Owing to their high degree of condensation, these mixed resols are not suitable as cement resins. Also, on account of their high content of basic components, they cannot be hardened with acids, or they cannot be hardened because of their shortage of reactive groups.

Mixtures of methylol phenol and methylol alkylphenols in approximately equivalent proportions can only be hardened, even in the presence of acids, when heated for example to at least 120°. They are therefore unsuitable for use in coldsetting cement resins.

The preparation of resols by reacting formaldehyde with adducts of phenol and styrene has been described in U.S. Pat. No. 3,526,559. These resins are soluble in water, but have a high alkali content. They are therefore unsuitable for acid-setting cements.

Thus the previously proposed phenol resins which may be used in acid-setting cements mostly have inadequate storage properties and a poor resistance to alkalis, while, on the other hand, etherified phenol resins do not harden at all or harden to only a minor degree at room temperature.

According to the present invention we now provide a process for the preparation of a cement composition yielding alkali-resistant bonds which comprises mixing a solution of at least one partially etherified methylol phenol and at least one partially etherified methylol alkylphenol in a solvent, said methylolated phenols having at least two positions reactive with formaldehyde and being free of alkaline catalysts used in their preparation, with a cement powder containing an acid catalyst. The phenolic component of such cements which is mixed with cement powder has in general good storage properties. Further, the cement mixture has in general a longer processing time and a shorter setting time at room temperature than the previously proposed cements and the hardened cement has a very good resistance to alkalis and in particular a good early resistance to alkalis.

At the same time, the good properties of the formerly used phenol resin cements are for the most part retained, e.g. their resistance to solvents and to nonoxidising and weakly oxidising acids. Moreover their degree of shrink on processing is generally small and in some cases there is no observable shrinkage. The last property is exceptionally important, as it makes it possible for the first time to use phenol resin cements for the manufacture of acid-resistant flag-stones and masonry.

To obtain optimum results, we have found that it is advantageous if the compounds used for the preparation of the resin component and the cement are present in the following ratios. The molar ratio of phenol to alkylphenols is preferably from 90:10 to 70:30, more preferably from 85:15 to 75:25. The ratio of molar equivalents of phenols to etherifying agent is preferably from 99:1 to 80:20, more preferably from 98:2 to 90:10. The molar ratio of phenols to formaldehyde is preferably from 1:1 to 1:2.7, more preferably from 1:1.3 to 1:2.2. The weight ratio of partially etherified methylol phenols to cement powder is preferably from 1:1 to 1:7, more preferably from 1:1.5 to 1:5. Finally the solution of partially etherified methylol phenols preferably has a solids content of 50–90%, more preferably 70–85%.

The partially etherified methylol alkylphenol component is based on alkylphenols which are di- or trifunctional with respect to formaldehyde, preferably o- and p-alkylphenols the alkyl group of which contains from 1 to 20 carbon atoms and is a straight-chained, branched or cycloalkyl group which is optionally substituted by an aryl group. Suitable alkylphenols thus include for example p-isopropyl-, p-tert butyl-, p-isooctyl-, p-iso-nonyl-, p-iso-dodecyl-, o-sec-butyl-, o-isononyl-, o-iso-dodecyl-, p-cyclohexyl-, 3,5-diisopropyl- and 3,5-diisobutylphenol. As indicated above the term "alkylphenol" includes aralkylphenols, for example adducts of vinyl aromatic hydrocarbons to phenol. The alkylphenol component may if desired contain a minor amount of phenols substituted by more than one alkyl or aralkyl group, preferably substituted phenols which have the same or similar reaction rates with formaldehyde as phenol. Thus for example the alkylphenol component may comprise a mixture of o- and p-monoethylidenephenyl-phenol and small amounts of 2,6-diethylidenephenyl-phenol and 2,4-diethylidenephenyl-phenol.

The phenolic hydroxyl groups are partially etherified by reaction with an etherifying agent, for example a dialkyl sulphate, such as dimethyl sulphate or diethyl sulphate, diazomethane or a halogen-containing compound having the halogen atom(s) attached to a saturated aliphatic carbon atom and having no further reactive groups, for example alkyl halides and alkenyl halides such as methyl chloride, methylene chloride, ethyl chloride, tertbutyl chloride, benzyl chloride, xylylene dichloride and allyl chloride, and 2,2-dichlorodiethyl ether. Etherifying agents containing two halogen atoms are preferably reacted at only one halogen atom. Particularly suitable etherifying agents include those compounds which yield phenol ethers containing functional groups. Thus for the preparation of phenol ethers containing hydroxyl groups, suitable etherifying agents include for example epoxide compounds (for example ethylene oxide, propylene oxide, butadiene diepoxide, styrene oxide, hydroxypropylene oxide and epoxy resins, e.g. the diglycidyl ethers of bisphenols, epichlorohydrin and epibromohydrin), halohydrins (for example ethylene chlorohydrin, ethylene bromohydrin and propylene chlorohydrin), and other halogenated alcohols (for example 3-chloropropanol and glycerin chlorohydrin and dichlorohydrin). For the preparation of phenol ethers containing keto groups, halogenated ketones such as chloroacetone, bromoacetone and dichloroacetone may be used. It is also possible to use mixtures of these etherifying agents.

The reaction conditions for the reaction of the phenols with formaldehyde are such that predominantly methylol compounds are yielded to the exclusion of higher condensates. Moderate reaction temperatures from 20° to 80°C, preferably from 30° to 60°C, and relatively high concentrations of an alkaline catalyst are generally used since the methylol groups are then stabilised. Preferred alkaline catalysts include hydroxides of metals from groups I and II of the Periodic Table according to Meyer and Mendelajew, tertiary amines and quaternary ammonium salts, and in particular sodium and potassium hydroxide.

In the preparation of the partially etherified methylol phenols, reaction of the phenol components with formaldehyde to yield methylol compounds is followed by partial etherification of the phenolic hydroxyl groups. This is preferably effected at the same or lower temperatures than the reaction with formaldehyde, so as not to increase the condensation level of the phenol-formaldehyde adduct. The alkaline catalysts or amines already used in the preparation of the methylol compounds also serve as condensation catalysts for the etherification. The addition of other alkaline catalysts at this stage may on the other hand be convenient.

When the reaction is complete, the catalyst is neutralised and, in general, the salt formed is removed. For neutralisation, organic and/or inorganic acids, such as formic acid, acetic acid, lactic acid, oxalic acid, hydrochloric acid, sulphuric acid or phosphoric acid are used.

To improve the ease of mixing the partially etherified methylol phenols with the cement powder, the phenol component is used in solution in a solvent. Preferred solvents are reactive solvents, i.e. solvents which, under the said setting conditions, increase their molecular size either by self-condensation or by reaction with the partially etherified methylol phenols. Examples of reactive solvents which may be used are phenol, the cresols, benzaldehyde, benzyl alcohol, epichlorohydrin, glycerin chlorohydrin or dichlorohydrin and, particularly, furan derivatives such as furfuryl alcohol or furfural. A preferred embodiment of the invention lies in using the partially etherified methylol phenol component in solution in furfural having a low water content.

The cements are generally prepared by mixing the solution of the resol with the cement powder immediately before use.

The cement obtained is then applied on or between the materials which are to be cemented together, and is immediately processed according to conventional trade methods. Hardening generally takes place at temperatures from 15° to 35°C.

The cement powder comprises filler and an acid catalyst. The filler is generally a conventional filler such as coke, artificial graphite, quartz, barium sulphate or a mixture thereof. The following are examples of acid setting catalysts: sulphuric acid, hydrochloric acid, phosphoric acid, the sulphonic acids and their acid-yielding derivatives such as the sulphonyl chlorides and esters, preferably those with alcohols containing 1 to 12 carbon atoms, acid esters of sulphuric acid, especially with the aforementioned alcohols, and acid salts, used either alone or in admixture.

For evaluation of the qualities of the cement, the important criteria are the properties of the resols before they are mixed with the cement powder, the properties of the cement after mixing, the nature of the hardening process and the chemical and physical properties of the hardened product. The resol should have a low condensation rate and low viscosity, so that good wetting of the filler is guaranteed, even after long storage. Likewise, the resol should store well, i.e. the condensation rate of the resol should not increase, or should increase only very slightly during storage so that the filler is still easily wetted. Otherwise, errors in processing can occur. After the cement powder is mixed with the resol, enlargement of the phenol resin molecules immediately takes place as a result of the reaction catalysed by the acid hardener, and this finally leads as the cement sets to total loss of processing consistency. The time between the mixing of the cement and this loss, the so-called processing time, should preferably span a period which is long enough to permit comfortable processing, i.e. about 1 to 2 hours. Following the processing, the cement should set in the shortest time possible, at room temperature, and the set cement should rapidly develop an adequate and increasing resistance to chemicals.

The storage properties of the resins or resin solutions produced according to the process of the invention are in general much improved over those of the resins previously used for this purpose. Whereas the resins used up till now became unusable after only 2 or 3 months owing to increased viscosity, we have found that the phenol resins according to the present invention are generally practically unchanged and have retained the viscosity necessary for processing even after 1½ years' storage. At temperatures of 50°C, the change in viscosity does accelerate, but the increase in viscosity is about 10 times slower than with the phenol resols formerly used.

The processing time of the cements according to the invention is in general considerably longer than that of cements produced with conventional phenol resins. Thus, for example, processing times of 70 to 120 minutes are obtained, as against the previous 30 to 60 minutes. In addition, the final properties desired of the cements according to the invention generally appear more rapidly. In contrast to conventional cements, the cements according to the present application which we have prepared are resistant to 5–15% sodium hydroxide solution after only 3 days. Resistance to solvents and non-oxidising and weakly oxidising acids also develops quickly.

The following Examples serve to illustrate the preparation of alkali-resistant cements according to the present invention. In the Examples T indicates parts by weight and all percentages are by weight.

EXAMPLE 1

In a reaction vessel provided with reflux cooler, thermometer and stirrer, 1880 T of phenol are mixed with 3.5 T of concentrated sulphuric acid. The mixture is heated to 140°C and 400 T of styrene are then added over a period of 60 minutes. The temperature is maintained for a further 60 minutes at 140°C and is then lowered to 50°C. 500 T of 33% sodium hydroxide solution and 4000 T of 30% aqueous formaldehyde are added, and the mixture is stirred at 50°C, until the formaldehyde content is less than 2%, slight cooling being required. 65 T of propylene oxide are then added, and the mixture is again stirred until the formaldehyde content falls to 0.7%. The mixture is cooled to 40°C and while maintaining this temperature sulphuric acid is introduced until the pH value is 6.5. The neutralised alkaline catalyst precipitates out and is removed and water is then distilled off in vacuo at a maximum temperature of 55°C until 80% of the mixture remains.

The residual mixture is dissolved in 1000 T of furfural, giving a resin solution with a 68% solid resin content and a viscosity of 410 cP at 20°C. This solution is filtered to free it from inorganic components.

The yield is 4800 T of aa solution of a phenol resol in furfural.

A cement is prepared by mixing 100 T of this resin solution with 200 T of a cement powder containing 100 T of powdered coke with a maximum particle size of 0.3 mm to 5T of benzenesulfonyl chloride.

EXAMPLE 2

In a reaction vessel equipped as in Example 1, 600 T of p-tert-butylphenol, 300 T of toluene, 240 T of 33% sodium hydroxide solution and 800 T of 30% aqueous formaldehyde are stirred together at 60°C for 4 hours. The formaldehyde content falls to 1%. Subsequently, 1500 T of phenol, 360 T of 33% sodium hydroxide solution and 3190 T of 30% aqueous formaldehyde are added, and the mixture is stirred at 50°C for 3½ hours, when the formaldehyde content has fallen to 1.3%. 35 T of propylene oxide are then added and the mixture is stirred for a further 12 hours at 60°C. The sodium hydroxide content is neutralised with sulphuric acid until a ph of 6.5 is reached and the precipitated aqueous phase is then removed. Water is removed from the resin solution at a maximum temperature of 50°C under reduced pressure by azeotropic distillation with recycling of the non-aqueous phase. The warm solution is then suction filtered to remove the inorganic components and the residual solvent is removed at a maximum temperature of 45°C and at a pressure of 20 mm Hg.

The yield is 3300 T. 83 T of this resin are dissolved in 17 T of furfural. The viscosity of this solution is 400 cP at 20°C.

A cement is prepared by mixing 100 T of this solution with 200 T of the cement powder used in Example 1.

COMPARISON EXAMPLE 1

A resol is prepared from phenol, styrene and formaldehyde, analogously to Example 1 but omitting the reaction with propylene oxide. When the formaldehyde content has fallen to 1.1% the resin is neutralised, worked up as in Example 1 and dissolved in furfural.

A cement is prepared by mixing 100 T of this solution with 200 T of the cement powder used in Example 1.

COMPARISON EXAMPLE 2

In the apparatus described in Example 1, 1880 T of phenol, 600 T of 33% sodium hydroxide solution and 3990 T of 30% aqueous formaldehyde are reacted analogously to Example 1. After 5 hours the formaldehyde content has fallen to 1.3%. The mixture is neutralised with sulphuric acid until the pH is 6.5, and is then worked up and dissolved in 900 T of furfural. 4300 T of a resin solution are obtained with a solid resin content of 60% and a viscosity of 620 cP at 20°C.

A cement is prepared by mixing 100 T of this solution with 200 T of the cement powder used in Example 1.

Tests have been carried out on the resol solutions and on the cements formed therefrom according to the Examples to determine the storability of the former and the physical and chemical characteristics of the latter. The results of these tests are given in the Tables which follow.

The viscosity of the resol solutions at 20°C was determined immediately after their preparation and after storing under various temperature conditions for different periods of time (12 days at 50°C and 540 days at 20°C). The increase in viscosity of each solution on storage can be used as a measure of its storability. The results are given in Table 1.

The hardening speed was measured by determining the Shore hardness D according to DIN 53505, and the hardness of an article moulded from the cement was determined after 24, 48 and 72 hours respectively.

Cylindrical test articles with a diameter of 25 mm and height of 25 mm were used for determining the early resistance to alkalis. The test articles were stored for 3 or 8 days in the air at 20°C, and were then immersed in 5%, 10% or 15% sodium hydroxide solution for 5 weeks.

The linear shrinkage was determined on cylindrical test articles having a diameter of 25 mm and a height of 100 mm and additionally provided at both ends with 2 glass marks to permit precise measurement of the length. The linear shrinkage of the test article at 20° and at 60°C was calculated as the percentage reduction in length of the test article after storing for 30 days at 20° and 60°C respectively.

The resistance to solvents was tested by immersing test articles which had either been stored at 20°C for 8 days or tempered for 24 hours at 60°C and subsequently treated in boiling ethanol, chloroform or acetone for 40 hours.

The results of the cement tests are given in Table 2.

Table 1

Viscosity (CP) of resol solutions under different storage conditions

| Example | immediately | after storage at 50°C for 12 days | after storage at 20°C for 540 days |
|---|---|---|---|
| 1 | 410 | 2200 | 1500 |
| 2 | 400 | 5200 | 1550 |
| Comparison 1 | 380 | 22400 | 16400 |
| Comparison 2 | 620 | 67500 (8 days) gelatinised (12 days) | gelatinised |

Table 2

Properties of Cements

| Resol Prepared as in Example | Processing time [mins] | Shore hardness D (DIN 53505) After being stored | | | Early resistance to alkalis in sodium hydroxide solution After storage at 20°C in the air for | | Shrinkage [%] After storage at | | Resistance to Solvents After storage at | |
|---|---|---|---|---|---|---|---|---|---|---|
| | | 24 hrs | 48 hrs | 72 hrs | 3 days | 8 days | 20°C | 60°C | 20°C | 60°C |
| 1 | 80 | 50 | 80 | 80 | no effect | | 0.0663 | | slightly rough surface | good unchanged |
| 2 | 70 | 70 | 80 | 80 | no effect | | 0.0796 | | slightly rough surface | good unchanged |
| Comparison 1 | 60 | 70 | 80 | 80 | decomposes after 1 day | attacked* | not tested | | slightly rough surface | good unchanged |
| Comparison 2 | 40 | 70 | 80 | 80 | decomposes after 1 day | attacked* | 0.0932 | | slightly rough surface | good unchanged |

*in 15% sodium hydroxide solution, only swelling

What we claim is:

1. A process for the preparation of an acid-hardenable cement composition yielding alkali-resistant cements which comprises mixing a) a solution of a resol resin derived from at least one methylol phenol partially etherified at the phenolic hydroxy group and at least one compound selected from the group consisting of a methylol alkylphenol and a methylol aralkylphenol, both partially etherified at the phenolic hydroxy group in a reactive solvent which increases its molecular size by self-condensation or by reactionn with the resin under setting conditions, the basic phenol components having at least two positions reactive with formaldehyde and the resin being freed from alkaline catalysts used in its preparation, with b) a cement powder containing an acid setting catalyst.

2. A process for the preparation of an acid-hardened, alkali-resistant cement which comprises curing at a temperature from 15° to 35°C a mixture of (a) a solution of a resol resin derived from at least one methylol phenol partially etherified at the phenolic hydroxy group and at least one compound selected from the group consisting of a methylol alkylphenol and a methylol aralkylphenol, both partially etherified at the phenolic hydroxy group in a reactive solvent which increases its molecular size by self-condensation or by reaction with the resin under setting conditions, the basic phenol components having at least two positions reactive with formaldehyde and the resin being freed from alkaline catalysts used in its preparation, with b) a cement powder containing an acidic setting catalyst.

3. A process as claimed in claim 2 wherein the molar ratio of phenol : alkyl phenol components in the partially etherified methylol phenols is from 90 : 10 to 70 : 30.

4. A process as claimed in claim 2 wherein the partially etherified methylol phenols are the partial etherification products of basic reaction products of phenols with formaldehyde in a molar ratio of phenols to formaldehyde of from 1 : 1 to 1 : 2.7.

5. A process as claimed in claim 2 wherein the partially etherified methylol phenols are the reaction products of the methylol phenols with an etherifying agent in a molar equivalents ratio of phenols to etherification agent of from 99 : 1 to 80 : 20.

6. A process as claimed in claim 2 wherein the solution of partially etherified methylol phenols is mixed with cement powder in a weight ratio of from 1 : 1 to 1 : 7.

7. A process as claimed in claim 2 wherein the solution of partially etherified methylol phenols has a solids content of from 50 to 90% by weight.

8. A process as claimed in claim 2 wherein the partially etherified methylol alkylphenol component is based on an o- or p-alkylphenol, the alkyl group having from 1 to 20 carbon atoms and being a straight chain, branched or cycloalkyl group optionally substituted by an aryl group.

9. A process as claimed in claim 2 wherein the partially etherified methylol alkylphenol component is based on at least one aralkylphenol which is an addition product of a vinyl aromatic hydrocarbon to phenol.

10. A process as claimed in claim 2 wherein both the methylolation and the partial etherification of the phenols is performed at a temperature from 20° to 80°C.

11. A process as claimed in claim 2 wherein the partially etherified methylol phenols are dissolved in a solvent reactive towards the partially etherified methylol phenols.

12. A process as claimed in claim 2 wherein the cement powder comprises filler and an acid catalyst.

13. A process as claimed in claim 2 wherein
c. the molar ratio of phenol : alkylphenol components in the partially etherified methylol phenols is from 85 : 15 to 75 : 25,
d. the molar ratio of phenols to formaldehyde in the basic reaction to obtain methylolated phenols which are subsequently partially etherified is from 1 : 1.3 to 1 : 2.2,
e. the molar equivalent ratio of phenols to etherification agent in the partially etherified methylol phenols is from 98 : 2 to 90 : 10,
f. the partially etherified methylol phenols are dissolved having a solid content of from 70 to 85% by weight in the solution and
g. the solution of the partially etherified methylol phenols is mixed with cement powder in a weight ratio of from 1 : 1.5 to 1 : 5.

14. A cement composition yielding alkali-resistant cements consisting essentially of a mixture of (a) solution of a resol resin derived from at least one methylol phenol partially etherified at the phenolic hydroxy group and at least one methylol alkylphenol and a methylol aralkylphenol, both partially etherified at the phenolic hydroxy group in a reactive solvent which increases its molecular size by self-condensation or by reaction with the resin under setting conditions, the basic phenol components having at least two positions, reactive with formaldehyde and the resin being freed from alkaline catalysts used in its preparation, with b) a cement powder containing an acidic setting catalyst.

* * * * *